Patented Oct. 11, 1949

2,484,375

UNITED STATES PATENT OFFICE 2,484,375

CORN PRODUCTS

Ralph Cover, Westminster, Md., assignor to The United Products Company, Westminster, Md., a corporation of Maryland No Drawing. Application January 20, 1947, Serial No. 723,206

10 Claims. (Cl. 99—186)

This invention relates to corn products and methods of preparing corn products.

An object of this invention is to produce corn products which contain finely divided corn kernels and which are substantially free of corn silks, cob tissues and worms.

Another object of this invention is to improve the quality, flavor and taste of corn products.

Another object of this invention is to provide efficient and economical processes for the preparation of corn products.

While present day packaged frozen corn products consisting of cut, substantially whole kernels of corn are wholesome and have marked popularity, the full flavor of the corn as freshly cut in the field has not been captured in these products, and no effective provision is made in present day processes to compensate for this loss without entailing the inclusion in the corn product, of corn silks, cob tissues and worms. The natural sugar in corn kernels after cutting the ear from the stalk is converted within a few hours to starch, and, in any commercial processing of cut corn for packaged material, this sugar is necessarily lost because of the time consumed in such processing. This lost flavor is not regained by adding sugar to the outside of the kernels before freezing because due to the relatively impermeable hull there is no dispersion of the sugar throughout the cut corn kernels. Such resulting products have a taste resembling sugar coated corn grains instead of the wholesome flavor of freshly cut corn. The cut kernels may be embedded in a mass of the milky, starchy endosperm comprising, with the chit, the portion of the corn kernel contained within the hull. With sugar and salt added to such a mass and sufficient time permitted for their assimilation, a product may be prepared with cut kernels of corn which has the sugar relatively uniformly dispersed throughout the mass. However, the mass of the milky, starchy endosperm contains cob tissues, corn silks and worms as produced by present day methods, and the presence of these foreign substances unfavorably affects the flavor of the resulting product. The present day methods of producing a corn product containing the mass of starchy endosperm involve cutting the tops of the kernels and scraping the remaining portion of the kernels from the cob. Because of the pressure applied by the conveying mechanism, such as the spur wheels, and by the cutting and scraping mechanism itself, it is impossible to cut and scrape the cob by these present day methods without also removing from the cob the fine, fuzzy cob tissues adjacent the kernels. In addition to these cob tissues, corn silks and worms, such as the European corn borer, are contained in these scrapings. And the presence of these foreign substances in the scrapings affect unfavorably, from an appearance, flavor and taste standpoint, any product of which they are a component. Therefore, although the addition of scrapings having sugar and salt assimilated therewith to cut corn kernels compensates for the natural sugar lost from freshly cut corn, the presence of foreign substances such as cob tissues, corn silks and worms in these scrapings will affect the resulting product unfavorably.

This invention involves so compensating for the sugar lost from freshly cut corn as to produce new corn products, which have added sugar uniformly dispersed throughout the product and are substantially free of foreign substances, such as corn silks, cob tissues and worms. The process by which these new corn products are prepared avoids the scraping operation and includes the removal, after cutting, of foreign substances from kernels of corn employed as components in the new corn products. The new corn products comprise two components, a kernel component and a finely divided component. The kernel component consists of corn grains divided into not more than three parts. Desirably, the size of the individual kernels of the kernel component is at least 30% of the whole kernel and the size is preferably from 40 to 90% of the whole kernel. The finely divided component is prepared from whole corn grains or parts thereof, and desirably these corn grains, prior to reduction to a finely divided state, are not divided into more than three parts and each kernel is not smaller than 30% of the whole kernel. The corn products employed for the kernel component, those used to produce the finely divided component and the resulting corn product are substantially free of foreign substances such as cob tissues, corn silks and worms.

To prepare the new corn products, the ears of corn are first properly trimmed and the corn grains or parts thereof are cut from the cob by any suitable mechanism such as that disclosed in U. S. Patent 2,141,346 granted to applicant on December 27, 1938. If the kernel component comprises grains of corn cut into two or three parts, a cutting machine having multiple cutters may be employed whereby the grains of corn on the cob are cut substantially simultaneously, or in sequence into two or three parts. Preferably, although not necessarily, the cut corn grains are processed through a silker which removes large pieces of cob tissue, many silks, some husks and breaks up clusters of grains, which sometimes cling together, particularly if the cutting machine operates efficiently. The silker comprises a plurality of separated wires forming a tray onto which the cut corn grains are placed. The corn silks cling to the wires of the silker, while the pieces of cob are retained on the wires through which the cut corn grains pass. From the silker, the cut corn grains are preferably, although not necessarily, processed in a shaker-rinser. The shaker-rinser comprises a screen table divided into two screens through which the cut corn grains are incapable of passing, while the chits or hearts of the corn and other finely divided matter pass through the screen. This second part of the screen of the shaker-rinser has water running on it, while the first part of the screen may have water running on it although preferably it does not. From the shaker-rinser, or if neither a shaker-rinser or silker is employed, from the cutting machine, the cut corn grains are placed in a flotation washer, which is fundamentally a separator in which water is used to separate the cut corn grains from the cob tissues, corn silks and worms by flotation. Desirably, there is a surface current on the top of the water in the flotation washer, and the cut corn grains are dropped into this surface current. Cob tissues, worms and corn silks float away. In addition, immature corn too young for canning and pithy grains also float away, while the cut corn suitable for the corn product drops to the bottom of the flotation washer. The cut corn grains preferably, although not necessarily, are passed through another shaker-rinser having two screens, the first of which is maintained in a wet condition by the continual passage of water therethrough, while the second is in a dry condition. After passing through this shaker-rinser, the cut corn grains are ready for the preparation of the mixture of the new product. If the shaker-rinser is not employed, the corn grains are taken directly from the flotation washer. For the preparation of the finely divided component of the new corn product, the cut corn grains which are substantially free of foreign substances, such as cob tissues, corn silks and worms, are ground and chopped to a divided state sufficiently fine to pass through an 8 mesh sieve (aperture opening .097 in.) and preferably through a 10 mesh sieve (aperture opening .0787 in.). Alternately, the finely divided component may be prepared from the whole kernels of corn, for example, which are washed after cutting in the flotation or other washer as described, and the kernels rolled by any suitable mechanism to remove the hulls. The endosperm contained within the hull in the original corn grain is separated from the hull. The endosperm, with or without the chit, may then be ground or chopped to a divided state sufficiently fine to pass through an 8, and preferably, a 10 mesh sieve to produce a finely divided component containing substantially none of the hulls of the corn grains from which it is prepared. Whether the finely divided component is prepared from cut kernels of corn having the hulls thereon or without the hull, it is mixed with the kernel component in the desired proportions and sugar and salt added to effect the desired flavor. Preferably, the salt and sugar are added in an aqueous solution because it assists materially in the dispersion of these materials through the mass of the corn product. As a result, the sugar is assimilated by the corn product and gives character to it. The product is then heated to about 180° F. to arrest the enzymic activity and render the product stable. The product is packaged in suitable containers and sterilized, if necessary. If the corn product is to be marketed as a frozen product, it is forthwith frozen without sterilization to a temperature of about 0° F. or below.

If desired, the chit or embryo may be substantially eliminated from the corn product. By cutting the corn sufficiently shallowly, only a negligible amount of the chit may remain in the cut corn, or the corn may be cut more deeply so that the chit in the cutting operation becomes loosened, but not freed from the cut corn. In either case, by passing the cut corn a sufficient number of times over the shaker-rinser, the cut corn may be freed substantially of the chits. It may then be processed through the flotation washer to free it of the foreign substance such as cob tissues, corn silks and worms. To prepare a corn product which is substantially free of chit, cut corn grains produced in the manner described and which are substantially free of chit as well as corn silks, cob tissues and worms, are finely divided and mixed with the cut corn kernels forming the kernel component of the product and prepared in a similar manner and which are also substantially free of chits, corn silks, cob tissues and worms.

The proportion, by weight, of the kernel component of the new corn product is ¼ to ⅘, preferably 25 to 40%, of the total quantity of the kernel component and the finely divided component. During the processing of the cut kernels constituting the kernel component, in the transfer of the cut kernels from one step to another, the hulls of a greater or less proportion of the cut kernels are detached from the endosperm and sometimes the chit contained within the hull of the kernel. In determining the amount of the kernel component in the product, these empty hulls are excluded and do not constitute part of the kernel component of the product. The corn product contains sufficient sugar and salt to obtain a concentration in the corn product of .3 to .7% by weight salt and 3 to 6% by weight sugar of the total combined quantity of the kernel component and the finely divided component. The corn product may also contain added water, and, if water is added, the sugar and salt may be incorporated in the corn product by the addition of an aqueous solution of the sugar and salt.

The kernel component may be the same or a different variety or maturity from the finely divided component. For example, whole kernels of corn of a maturity of the milk to the early cream stage may constitute the kernel component, while the finely divided component may be obtained by cutting and chopping corn grains of a maturity more advanced than the early cream stage. In this manner, corn having a maturity more advanced than the early cream stage may be utilized in the preparation of the new corn products. In the new corn products, the presence of finely divided older corn having a maturity more advanced than the early cream stage, when reduced to finely divided form to serve as a component, results in a product of superior taste and flavor because of the greater amount of character to be found in the more mature corn. If whole kernels of younger corn, such as those having a maturity of the milk to early cream stage, are mixed with finely divided older corn which is substantially free of foreign substances, or if the kernels of slightly more mature corn are divided into two or three parts, older corn which could not be employed even for the preparation of second or third grade products by present day methods, can be used as the finely divided component of a first grade product when prepared in accordance with this invention.

The depth of the grains of the kernel component of the new corn product and the division, if any, of the kernels into two or three parts, depends upon the variety of corn and its maturity. For example, whole kernels of Yellow Bantam or Golden Cross corn of a maturity of the early cream stage are satisfactory, while the kernels of certain varieties, such as Country Gentleman or Evergreen, in the cream stage of maturity have been divided into three parts. The size of each of the grains of the kernel component is not smaller than 30% and preferably is 40 to 90% of the whole kernel, the relative proportion of the whole kernel used for the kernel component depending upon the size of the whole kernel and upon the maturity. If the maturity is more advanced, the relative percent of the whole kernel used is at the lower end of the range, while when the corn is younger the size is toward the upper limit of the range.

A specific example of the practice of this invention is as follows:

Kernels of corn having a maturity of the milk to early milk stage are cut from the cob by apparatus similar to that disclosed in applicant's U. S. Patent 2,141,346. The kernels are cut at a point almost tangent to the termination of the cob tissues adjacent the kernels so that the cut kernels contain about 3/4 of the heart germ or embryo of the corn kernel. The average size of each grain is about 90% of the whole kernel. The cut kernels are then passed successively through the silker, shaker-rinser, flotation washer, and shaker-rinser as heretofore described. In the silker, most of the heart germ or chit is removed, while the passage through the flotation washer insures the substantial freedom of the corn kernels from corn silks, cob tissues and worms. Corn of a maturity of the dough stage is cut and freed of embryo, cob tissues, corn silks and worms in a similar manner. The corn grains of this older corn are chopped or cut sufficiently fine to be washable through an 8 mesh sieve with water. 54 lbs. of the finely divided older corn is mixed with 24 lbs. of the younger substantially whole kernel corn. To this mixture is added about 20 lbs. (about 2½ gals.) of an aqueous solution containing 120 lbs. of cane sugar and 15 lbs. of salt per 100 gals. of water. The resulting mixture is heated for a period of about four minutes in a batch mixer at 210° F. in order to arrest substantially completely the enzyme activity in the corn and render the resulting corn product stable. The mixture is then cooled to room temperature, packaged and frozen to 0° F. or below. By the addition of the aqueous solution of sugar and salt to the mixture, the sugar is dispersed throughout the finely divided component of the corn product, and the resulting corn product is substantially free from cob tissues, corn silks, worms, and contains substantially no empty hulls.

While in the preferred embodiment, the kernels of corn can but cut by apparatus similar to that disclosed in applicant's U. S. Patent 2,141,346, other cutting apparatus may be employed. For example, the rotating head type cutter may be employed. The advantage of employing such apparatus as disclosed in applicant's patent is that the cutting of the kernels is uniform, regardless of the irregularity of the shape of the ears, and as a result a lesser quantity of cob tissues are mixed with the cut corn. However, by the employment of cutting mechanisms such as the so-called rotating head cutter, the cob tissues can be removed in the flotation washer, and the resulting corn kernels will be substantially free from cob tissues, corn silks and worms.

Instead of the flotation washer, other means may be used to separate the cob tissues, corn silks, worms and other foreign substances from the cut corn kernels or parts thereof. Desirably, the separation is effected by utilizing the difference in specific gravity between the cut corn grains and the foreign substances such as cob tissues, corn silks and worms. Water through which a steady but gentle current passes has been found especially satisfactory for this purpose, because the cut corn kernels may be dropped into this stream, the cut corn kernels sinking to the bottom, while the cob tissues, corn silks, worms and other foreign substances float along with the stream. However, shallowly cut grains of corn may be effectively, although not quite as efficiently, substantially freed of foreign substances, such as cob tissues, corn silks and worms, by passing the cut kernels over vibrating or rotating screens through which the cut corn grains are incapable of passing. In those vibrating and rotating screens, water sprays completely wash and rinse thoroughly the corn kernels as they pass thereover, while the foreign matter passes through the screen.

While preferred embodiments of this invention have been described, various modifications may be made therein without departing from the scope of the appended claims.

What is claimed is:

1. The process of preparing a corn product comprising removing corn silks, cob tissues and worms by water from kernels of corn selected from the class consisting of whole kernels and parts of whole kernels of corn after removal from the cob, reducing said kernels to a finely divided state and mixing in the substantial absence of corn scrapings the resulting product with kernels of corn which are substantially free of corn silks, cob tissues and worms, and which are selected from the class consisting of whole kernels and parts of whole kernels of corn.

2. The process of preparing a corn product comprising reducing to a finely divided state kernels of corn selected from the class consisting of whole kernels and parts of whole kernels of corn, said kernels being substantially free of corn silks, cob tissues and worms, and mixing in the substantial absence of corn scrapings the resulting product with kernels of corn which are of a less advanced average stage of maturity than that of the kernels from which said resulting product was produced, which are substantially free of corn silks, cob tissues and worms, and which are selected from the class consisting of whole kernels and parts of whole kernels of corn.

3. The process of preparing a corn product comprising removing corn silks, cob tissues and worms by water from kernels of corn selected from the class consisting of whole kernels and parts of whole kernels of corn after removal from the cob, comminuting said kernels to a finely divided state, mixing in the substantial absence of corn scrapings ¼ to 3 parts of the resulting product with 1 part of kernels of corn which are substantially free of corn silks, cob tissues and worms, and which are selected from the class consisting of whole kernels and parts of whole kernels of corn.

4. The process of preparing a corn product comprising mixing 1 part of kernels of corn which are substantially free of corn silks, cob tissues and worms and which are selected from the class consisting of whole kernels and parts of whole kernels of corn with ¼ to 3 parts of finely divided corn grains which are substantially free of corn silks, cob tissues and worms.

5. The process of preparing a corn product comprising water washing kernels of corn after severance from the cob to remove cob tissues, corn silks and worms therefrom, comminuting the water washed kernels sufficient to pass through an 8 mesh sieve, mixing in the substantial absence of any corn scrapings the resulting comminuted product with a kernel component substantially free of corn silks, cob tissues and worms and which is selected from the class consisting of whole kernels and parts of whole kernels of corn.

6. The process of preparing a corn product comprising mixing in the substantial absence of corn scrapings 1 part of unblanched and uncooked kernels of corn which are substantially free of corn silks, cob tissues and worms and which are selected from the class consisting of whole kernels and parts of whole kernels of corn with ¼ to 3 parts of finely divided corn grains which are substantially free of corn silks, cob tissues and worms, and sterilizing the resulting mixture.

7. The process of preparing a corn product comprising water washing kernels of corn after removal from the cob to remove substantially completely corn silks, cob tissues and worms therefrom, reducing said kernels to a finely divided state and mixing in the substantial absence of corn scrapings the resulting finely divided product with kernels of corn which are water washed after removal from the cob to remove substantially completely corn silks, cob tissues and worms therefrom.

8. The process of preparing a corn product comprising water washing kernels of corn after severance from the cob to remove substantially completely corn silks, cob tissues, worms and embryo, reducing said kernels to a finely divided state and mixing in the substantial absence of corn scrapings the resulting finely divided product with kernels of corn which are substantially free of corn silks, cob tissues and worms.

9. The process of preparing a corn product comprising removing substantially all of the hulls from kernels of corn, which are substantially free of corn silks, cob tissues and worms, reducing the resulting endosperm to a finely divided state and mixing in the substantial absence of corn scrapings the resulting finely divided product with kernels of corn which are substantially free of corn silks, cob tissues and worms.

10. The process of preparing a corn product comprising mixing in the substantial absence of corn scrapings kernels of corn of a maturity averaging from the milk to early cream stage, which are substantially free of corn silks, cob tissues and worms and which are selected from the class consisting of whole kernels and parts of whole kernels of corn with finely divided corn grains produced from corn kernels of a more advanced average stage of maturity than the early cream stage, and which are substantially free of corn silks, cob tissues and worms.

RALPH COVER.

REFERENCES CITED

The following references are of record in the file of this patent:

UNITED STATES PATENTS

| Number | Name | Date |
| --- | --- | --- |
| 139,595 | McMurray | June 3, 1873 |
| 1,742,240 | Donthitt | Jan. 7, 1930 |
| 2,000,892 | Lewis | May 7, 1935 |

Certificate of Correction

Patent No. 2,484,375                                                          October 11, 1949

RALPH COVER

It is hereby certified that errors appear in the printed specification of the above numbered patent requiring correction as follows:

Column 5, line 71, for the words "but cut" read *be cut*; column 8, line 42, list of references cited, for "Donthitt" read *Douthitt*;

and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*